E. G. OTIS.
Car Brake.
No. 8,973. Patented May 25, 1852.
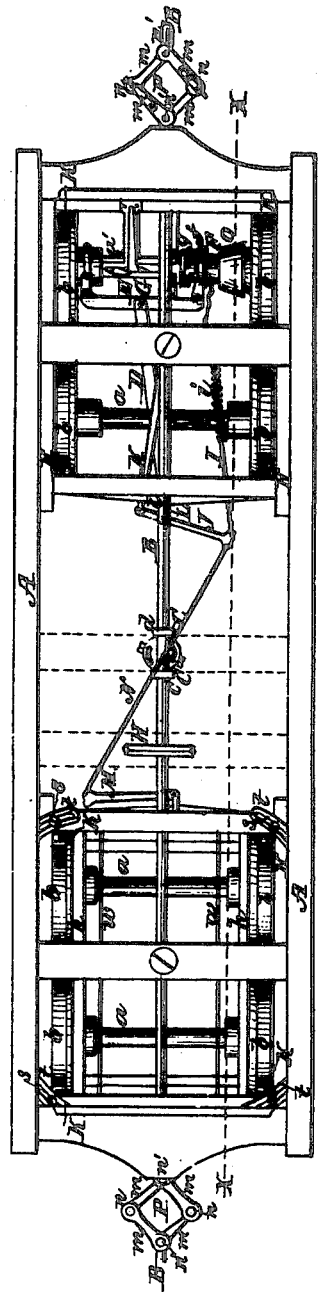

UNITED STATES PATENT OFFICE.

E. G. OTIS, OF BERGEN, NEW JERSEY.

RAILROAD-CAR TRUCK AND BRAKE.

Specification of Letters Patent No. 8,973, dated May 25, 1852.

*To all whom it may concern:*

Be it known that I, E. G. OTIS, of Bergen, in the county of Hudson and State of New Jersey, have made a new and useful improvement in railroad-brakes and also an improvement in the truck on the wheels of which the brake operates, said improvements being for the purpose of preventing accidents on railroads; and I do hereby declare that the following is a full, clear, and exact description of the construction and operation of the same, reference being had to the annexed drawings, making a part of this specification, in which—

Figure 1, is a plan or top view of the truck and brake. Fig. 2, is a vertical longitudinal section of ditto taken at the line X, X, Fig. 1. Fig. 3, is a side elevation of one of the trucks. Fig. 4, is a front elevation of ditto.

Similar letters of reference indicate corresponding parts in each of the several figures.

The nature of my invention consists in providing a rod which runs longitudinally or lengthwise of the trucks, said rods having a cam which will be hereafter described, placed at about the center of the rod and between the two trucks of each car. This cam when the rod is properly turned acts upon a bar connected with a toggle joint by the operating of which a collar which fits loosely on one of the axles is thrown in or out of gear with the axle by means of a clutch, a chain is attached to the collar which is also connected to a lever which by being suitably connected as will be hereafter shown causes the shoes to act against the wheels when said lever is operated; this lever is operated by throwing the collar in gear with the axle by turning the rod before mentioned in the proper direction; the collar then revolves with the axle and a chain is wound upon it acting upon the lever above mentioned; on one end of the collar there is a cap which fits over the hub of one of the wheels and by turning the aforesaid rod in the direction (opposite to the direction in which it is turned to throw the collar in gear with the axle) this cap is made to bear or act upon the hub of the wheel and create enough friction to retard or stop the motion of the cars in cases where instantaneous stopping is not required.

In a train of cars the several rods are connected by compensating joints which allow for the lengthening and contracting of spaces between the several cars.

The trucks are so constructed that if an axle gives way, the wheels are prevented from running off the track; this is effected by having strong guards which will be hereafter fully described, placed horizontally on each side of the wheels, and also by having the trucks supported in case of the breakage of a wheel or axle by the car's bed in a manner which will be presently shown.

The manner of operating the shoes, by means of the rod, cam, toggle joint, and collar in combination with the compensating joints, and the method of constructing the trucks, or the guards in combination with the arrangement for supporting the trucks from the car bed in case of the breakage of a wheel or axle.

To enable others skilled in the art to make and use my invention, I will proceed fully to describe its construction and operation.

A, Figs. 1, and 2, represents the car bed, and underneath it are the two trucks; B, is the rod which runs longitudinally or lengthwise of the trucks directly over the axles (*a*) of the wheels (*b*); this rod B, rests in bearings (*c*) (*c*) (*c*) (*c*) the two outer bearings, or those attached to the ends of the car bed, A, are formed of thin metal strips which give or yield in a measure so as to allow for any lateral or wabbling motion of the car.

C, is a cam attached to the rod B, at about its center and between the two trucks, the cam is attached to the rod in the following manner: a circular disk or plate (*d*) is secured to the under side of the rod having curved slots through it, see Fig. 1; underneath this plate (*d*) another plate (*e*) is secured by screws which pass through the curved slots in the upper plate (*d*); the cam C, is attached to the under surface of the lower plate (*e*), see Fig. 2; the cam forms a portion of an oval or ellipse placed obliquely on the plate (*e*).

D, is a bar having a recess in it in which the cam fits, see Fig. 2. This bar is connected to a toggle joint E, see Fig. 1, at the end of one of the levers of which is a clasp or band which encompasses the collar F, see Fig. 1. This collar works loosely on the axle (*a'*). The outer end of the other lever of the toggle joint is secured by a clasp or band which passes around the hub of the wheel (*b'*).

(*f*), Fig. 1, is one part of a clutch at one end of the collar F, (*g*) is the other part of the clutch on the axle (*a'*) the part (*g*) sliding on a feather on the axle.

G, is a lever at the lower end of which is a clasp or band which encompasses loosely the part (*g*) of the clutch. This lever is prevented from moving by a guard (*h*) the lever fitting in a notch or recess in the guard.

H, is a pulley on the rod B, around which a cord passes the ends entering the car through the bottom for the purpose of turning the rod B.

I, is a chain or cord attached to the collar F; the opposite end of the chain is attached to one end of a lever J; the chain I, has a spiral spring (*i*) upon it, the use of which will be hereafter mentioned; the opposite end of the lever J, to where the chain I, is attached is secured by a pivot to a bar or rod K, the outer end of which is secured to the cross rail (*j*) upon the two ends of which are shoes (*k*) (*k*); between the two ends of the lever J, and rather near the bar or rod B, is attached by a pivot a small rod L, see Fig. 2, and dotted lines in Fig. 1; this pivot is the fulcrum of the lever; this rod L, is attached to the cross rail (*l*) at the two ends of which are also shoes (*k*) (*k*); now it will be seen that if the lever J, is drawn toward the clutch both cross rails (*j*) (*l*) will be forced toward the wheels (*b*) and consequently the shoes (*k*), will press against them; the cross rails of the other truck of the car have a similar arrangement but the lever M, of this truck is connected to the lever J, by a diagonal rod N, and the position of the lever M, is reversed from that of lever J; the object of this is to effect a perfect operation of the lever and cross rails when the two trucks are upon a curve of the road. When the rod B, is turned from right to left the cam C, will throw the bar D, in the direction indicated by the arrow, Fig. 2; this movement acts upon the toggle joint and the collar F, and the part (*f*) of the clutch which is on the collar will lock into the part (*g*) on the axle (*a'*) the collar will then revolve with the axle (*a'*) and the chain I, will wind upon it drawing the outer end of the lever J, toward the clutch which causes the shoes (*k*) of both trucks to act against the wheels, as before described; the clutch is thrown out of gear by turning the rod in a reverse direction.

The cam C, may be changed or moved so that it will not operate or act upon the bar D, with a quick motion; this is done by loosening the screws and turning the lower plate (*e*) so that the cam will not have a very oblique position; the screws are then tightened; the adjustment may be made as circumstances require, the spiral spring (*i*) in the chain; by its elasticity, prevents any sudden strain coming upon the levers and cross rails when the clutch is thrown in gear. The cam may also be reversed on the rod B or turned in a reverse oblique position, so that, if a car is placed wrongly upon the track, or the back of the car where the front should be, the cam when in this reverse position would act in concert with the cams of the other cars.

On the end of the collar, opposite to where the part (*f*) of the clutch is placed, is a cap O, see Fig. 1, which fits over the hub of the wheel (*b''*). Now when the rod B, is turned from left to right the cap O, will press tightly over the hub which is of conical form, see Fig. 1, and create sufficient friction so as to allow the collar to turn and act upon the cross rails and thus press the shoes against the wheels sufficiently for ordinary purposes, where instantaneous stopping is not required.

P, P, are compensating joints; those joints are formed of two levers (*m*), see Fig. 1, connected by pivots (*n*) (*n*) (*n'*) (*n'*); the pivots (*n'*) connect the ends of the rods to the joint, and it will be seen that the ends of the rods may be forced near together or be drawn apart and still the rods will turn perfectly; these joints therefore compensate for the varying of the distance between the cars which happen in stopping and starting a train, owing to the play of the coupling, and the elasticity of the buffer; the pivots (*n*) (*n*) may be attached to small springs (*o*) (*o*) which have a tendency to keep them in place; these joints need not be disconnected by hand when the cars are disconnected for if the pivots (*n*) (*n*) are a little beveled on their lower surface, when the pull comes upon the joint the pivots will be drawn out and force up the springs (*o*) (*o*) the orifice in the lever below being a little beveled on its edge so as to allow the pivot to pass out. The sockets where the pivots (*n*) pass through are beveled so that if the joints are turned in vertical position, the rods B will accommodate themselves to the curvatures of the road, and the joints still work perfectly. In a train of cars the several rods B, being connected by those joints, if either of the pulleys H, is operated upon there being a pulley to each car so that the conductor must be near one of them all the clutches of the trucks will be thrown in gear; when this is not required any individual clutch may be thrown in gear by operating the lever G, which causes the part (*g*) of the clutch to lock into the part (*f*) on the collar, it being remembered that the part (*g*) works on a feather in the axle (*a'*).

Each truck is furnished with guards, two on the outer sides and two on the inner sides; the lower guards are represented by (p'), these guards are horizontal; bars of wood which inclose the wheels and prevent them from getting off the rail in case of the breaking of a wheel or axle; in Fig. 3, the two outer guards (p) (p') are seen and in Fig. 2, the two inner guards, the lower guards are connected by metal bands (r) which steady and strengthen them. See Figs. 3 and 4. The lower and upper guards have a vertical strip (v) which is placed between the wheels. These figures show how the wheels are inclosed by the guards and strips (v) and it will be seen that if an axle breaks, the wheels of the axle will be kept on the track by means of the guards the wheels either turning or slipping; and in case of the breaking of an axle near the bearing and the wheel forced against its shoe, the shoe of the opposite wheel will also bear against its wheel as the cross rails are connected by the rods (w) (w) seen in Figs. 1 and 2. Each truck has four bolts (s) (s) (s) (s) on its upper part these bolts have heads on them and pass through curved slots in projections or arms (t) (t) (t) (t) attached permanently to the under side of the car bed. Now it will be seen that if an axle or wheel break, the truck will still remain perfectly square and horizontal as it is supported by these arms (t) (t) (t) (t); nothing therefore can get out of place or be deranged. It will be seen that the arms do not interfere with the turning of the trucks as the bolts (s) work in the curved slots in the arms.

This invention will prevent effectually accidents which daily occur on our roads. Two important advantages are obtained, viz., simple and effectual manner of operating the brake and connecting the rods by the compensating joints so that the brakes of all the cars in a train may be operated upon or a single brake if desired, also by employing the guards and thus inclosing the wheels and supporting the truck from the car bed in case of the breaking of a wheel or axle, thus preventing the cars from being thrown off the track which has hitherto invariably occurred upon the breaking of wheels or axles.

I do not claim the winding of the chain around the axle for the purpose of pressing the shoes against the wheels, neither do I claim the clutch, nor the collar, separately for they have each been previously used; but What I do claim and desire to secure by Letters Patent, is—

1. The method of operating the toggle joint by means of the rod B, having the cam C, upon it which works in a slot in the bar D, by which the clutch is thrown in and out of gear or the cap O, made to bear against the hub of the wheel (b) in combination with the compensating joints P, constructed in the manner and for the purpose as shown and described.

2. I claim the employment of the guards (p) (p) (p') (p') vertical studs (v) and rods (w) (w) arranged as described for the purpose of inclosing the wheels and prevent them getting off the track in case of the breakage of a wheel or axle in combination with the arms (t) and bolts (s) by which the trucks are suspended to the car bed in the manner and for the purpose as herein specified.

E. G. OTIS.

Witnesses:
  O. D. MUNN,
  EL. POLHAMUS.